E. J. SWEETLAND.
PRESSURE FILTER.
APPLICATION FILED FEB. 1, 1909.
929,636.
Patented July 27, 1909.
3 SHEETS—SHEET 3.
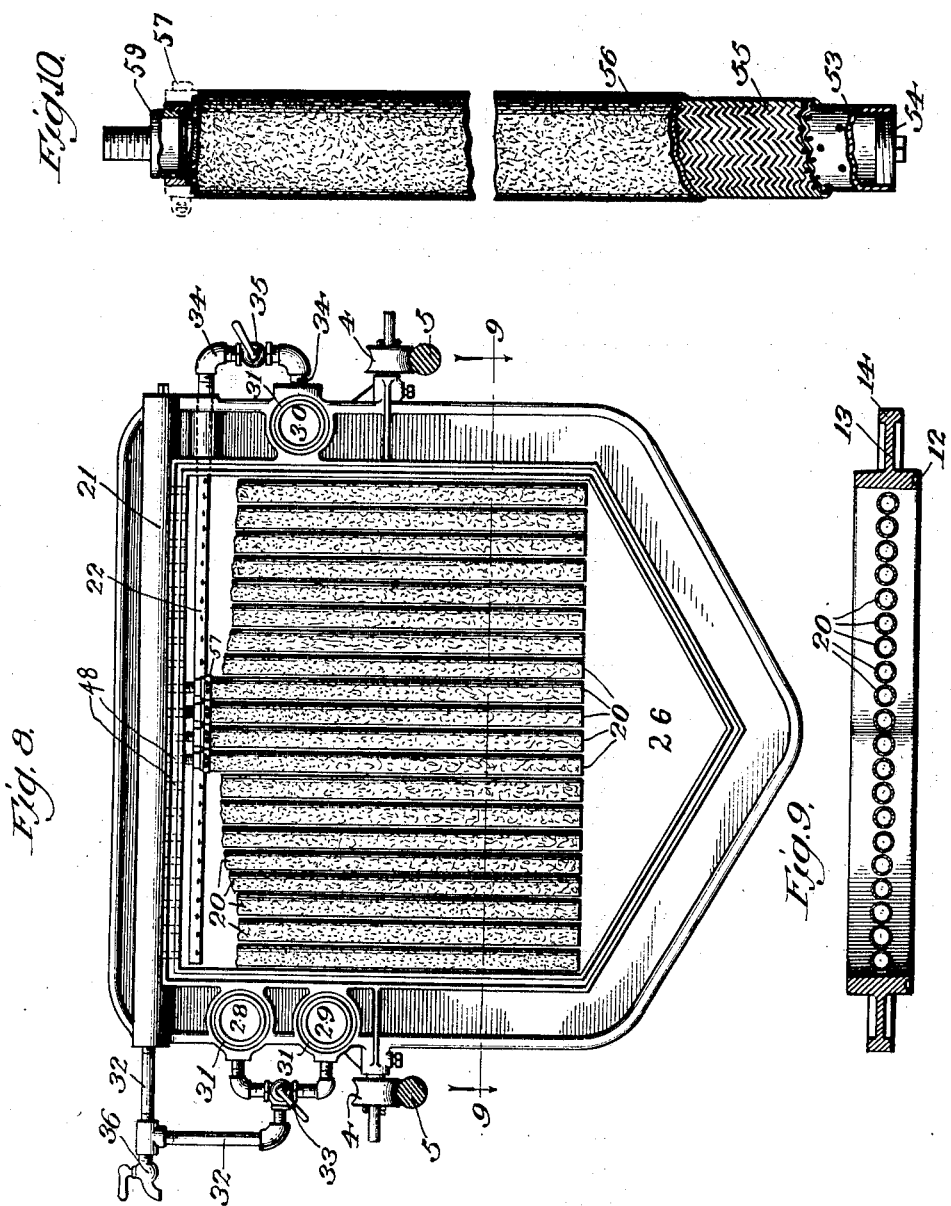

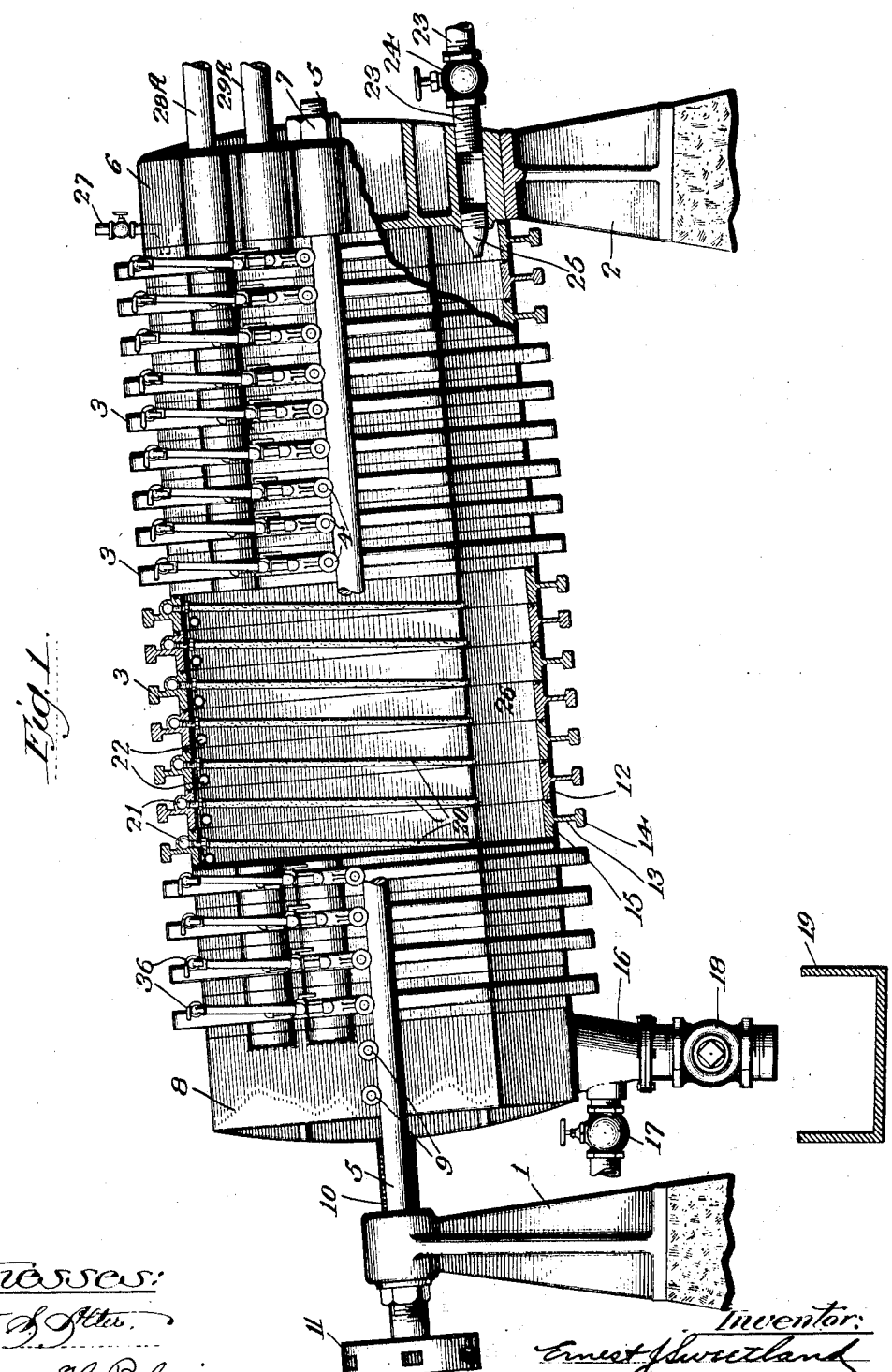

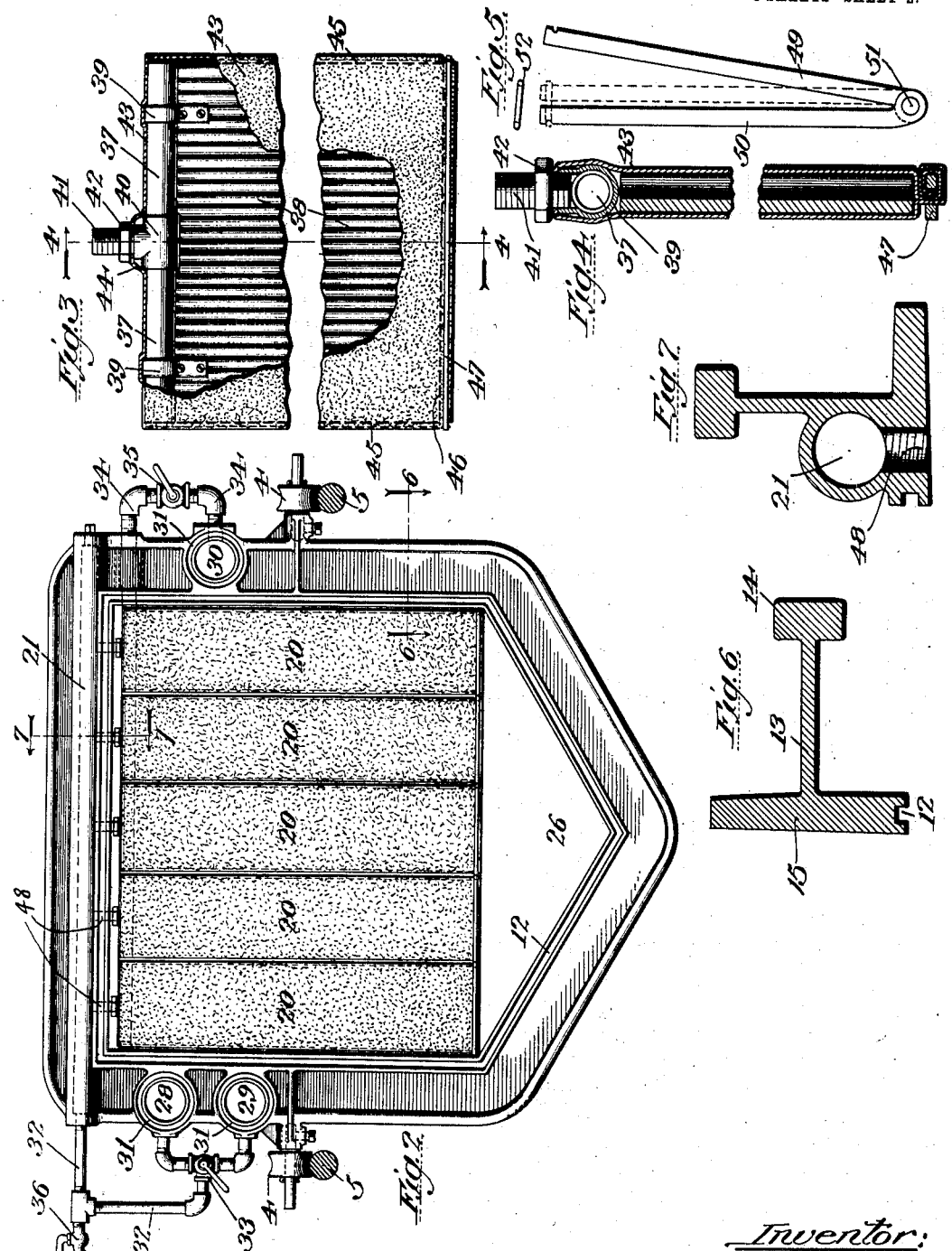

UNITED STATES PATENT OFFICE.

ERNEST J. SWEETLAND, OF LOS ANGELES, CALIFORNIA.

PRESSURE-FILTER.

No. 929,636.  Specification of Letters Patent.  Patented July 27, 1909.

Application filed February 1, 1909. Serial No. 475,509.

*To all whom it may concern:*

Be it known that I, ERNEST J. SWEETLAND, a citizen of the United States, and residing in the city of Los Angeles, county of Los Angeles, State of California, have invented new and useful Improvements in Pressure-Filters, of which the following is a specification.

Throughout this specification the term "residue" is used to designate the solid or semi-solid material deposited upon the filtering medium while filtration is in progress.

The object of this invention is to filter or clarify on a large scale liquids carrying solid matter in suspension.

A particular object of this invention is to provide a special means of discharging the accumulated solid matter from the filtering surfaces without hand labor, and without the necessity of separating the units of the machine, as is customary with ordinary filter presses.

A further object is to construct a pressure filter, which is much lighter in weight than filter presses which have iron plates between the frames.

A further object is to provide a pressure filter that is free from moving parts.

A further object is to provide a pressure filter so arranged that the thickness of the deposited cakes of residue upon the filtering surfaces may be adjusted according to the permeability of the residue, so that if the residue offers a high resistance to the passage of liquids a correspondingly thin deposit may be formed upon the filtering surfaces, but in cases where the residue is of a porous nature, a correspondingly thick deposit may be formed before discharging the contents of the filter.

In ordinary filter presses a thin deposit of residue may be made on the filtering cloths, if desired, but the labor of removing such a deposit from the filter cloth is so great that it is not economical to operate such filter presses unless the chambers between the filter cloths are sufficiently filled to form a compact cake.

A further object is to provide a filter press with a continuous unobstructed passageway along the bottom thereof that is in full communication with the filter devices and into which the residue may be dropped from the filter devices, and subsequently sluiced therefrom by the passage of a current of water therethrough.

A further object is to provide a pressure filter wherein unfilterable residue may be discharged by first causing it to fall from the filter devices into an open space below the filter devices, from which open space it is removed by means of a current of liquid.

A further object is to provide a pressure filter with suitable connections to the filter devices therein, which permit of the filter devices being placed in communication with any one of several conduits at the will of the operator.

A further object is to provide a frame for pressure filters, or filter presses, having a cross section substantially as shown, whereby great strength is given the frame, while the weight is reduced to a minimum.

In the common types of filter presses, the solid matter from the liquid being filtered, is deposited in a series of chambers between rigid-walls of filtering fabric and the result is that the solid matter so packed under pressure, offers a high resistance to the passage of a liquid through it, but in the invention herein described no such packing occurs, and consequently the deposited solid matter is more readily washed free from any soluble matter it may be desirable to recover therefrom, and furthermore, the solid matter not being packed in the form of a hard cake in my device, it is more easily removed by means of water under pressure, for the nature of the cake of residue is such that it readily disintegrates when a stream of liquid is brought to bear upon it. This feature will best be understood by referring to any ordinary type of filter press, which is built up of a series of corrugated plates and open frames or containers placed between the plates, and the filtering canvas placed over the faces of the plates in such a manner that when the press is assembled for use a series of cells with rigid canvas-covered walls is formed. When a liquid containing solid matter is filtered in these cells under pressure, it is found that the cakes formed in such presses are very compact, for the reason that the size of the cake of residuum is limited to the size of the cell, and as the cake has no room to expand it necessarily becomes harder and harder as more solid matter is forced in; while in my press it will be seen that the whole interior of the machine is practically a continuous chamber without partitions, and filter devices, as shown, each of which is a unit in itself, are placed in the upper part of the chamber, and have sufficient space between them to allow the deposited solid matter to build upon their surface without the cake being restricted as to shape or size. The deposited cakes are never allowed to become so thick that those in one frame come in contact with those in the adjacent frame, an open space always being left between them, which leaves the cake of deposited unfilterable matter free to fall to the open space below, when it is desired to discharge the cakes of residual unfilterable matter.

It is the intention of the inventor that the present application shall coöperate with Patents Nos. 885,398 and 887,285, both of which were issued to the present applicant.

A particular use of the invention described, is in the filtration of finely divided ores from cyanid solution in the cyanid process of gold extraction; and in the manufacture of sugar from sugar beets.

The invention will be more clearly understood by reference to the accompanying drawings, of which—

Figure 1 is a side elevation of the pressure filter assembled, with portions broken away to better illustrate the interior construction. Fig. 2 is an end elevation of one of the frames, or units, of which the filter is constructed, showing the filter devices in place in the upper part of the frame and the open space below them. Fig. 3 is a detailed elevation of one of the filter devices removed from the frame with a portion of the filtering medium broken away to show the interior construction. Fig. 4 is a vertical section on the line 4—4 of Fig. 3. Fig. 5 is the clip, by means of which the filtering fabric is held at the bottom of the filter device. Fig. 6 is a cross section of the frame on the line 6—6 of Fig. 2. Fig. 7 is a cross section on the line 7—7 of Fig. 2. Fig. 8 is an end elevation of one of the frames, or units, with a modified form of filter devices of tubular form shown therein, the upper portion of some of the devices being broken away to show the spray pipe. Fig. 9 is a sectional view on the line 9—9 of Fig. 8. Fig. 10 shows one of the tubular filter devices removed with sections broken away to show the interior construction.

Referring more particularly to the parts with special reference to Fig. 1, 1 and 2 are the main standards which support the body of the machine. The main body of the machine is built up of a series of frames 3, which are provided with the rollers 4, which rest upon the tie rods 5. The head 6 forms a closure for the upper end of the series of frames and is held by the nuts 7 upon the tie rods 5. 8 is another head, which forms a closure for the series of frames at the lower end. There is a pressure screw 10, which is operated by a lever inserted in the wheel 11; by means of this screw a high pressure is brought to bear against the head 8. The head 8 is provided with rollers 9, which allow it to move upon the tie rods 5 when the screw 10 is advanced or withdrawn. Each frame 3 is provided with a gasket 12 set in a groove around the face of the frame. When the head 8 is tightly pressed against the series of frames these gaskets seal the joints and a large water tight filtering chamber is formed with detachable filter devices therein; the walls of which are built up of a series of sections to promote accessibility to the interior thereof.

The whole machine is assembled in such a manner that the filter devices hang vertically, while the chamber is higher at one end than the other in order to promote drainage.

In a pressure filter where a large volume of liquid is to be handled it is desirable to have the frame of large area, and one of the special features of my invention is the method of constructing the frames to give the maximum strength with the minimum weight. This construction is adaptable to almost any type of sectional pressure filter.

Reference to the sectional portion of Fig. 1 clearly shows the shape of the cross section of the frame, where it will be seen that the cross section somewhat resembles an ordinary railroad rail, the web 13 uniting the bulb 14 to the main inner portion of the frame 15. I have found by actual tests that a frame so constructed will resist a much higher pressure than the same weight of metal distributed in the manner customary for filter press frames.

To the movable head 8 is attached a hopper 16 to which are connected the valves 17 and 18. A launder 19 is provided to carry away residues discharged through the valve 18.

Each frame carries a series of filter devices 20 which are suspended from the top of the frame and are in turn connected with the conduit 21, which runs across the top of each frame.

My invention is not restricted to the form of filter devices herein described, but each unit may be tubular, oval, flat or any shape desired which can be conveniently connected with the frames. The main object being to have a series of devices inclosed within the filtering medium, the whole being of such construction that the liquid under pressure, which surrounds the devices, passes through the filtering medium and subsequently out of the chamber of the press through conduits provided for the passage of the same.

22 is a perforated pipe which passes along the top of the frame mid-way between the rows of filter devices in the several frames. This pipe I term a "spray pipe", and its use is to project a spray of liquid upon the filter devices 20. This pipe is more clearly shown in Fig. 8.

A pipe connection 23 and the valve 24 are screwed into an opening in the bottom of the head 6 and on the inside of the same head is screwed the nozzle 25, in such a manner that when a liquid is projected through it it sweeps along through the space 26 below the filter devices and finally out through the valve 18.

No. 27 is a valved pipe connection, which communicates with the interior of the filtering chamber and serves either as an outlet or inlet for air, while the chamber is being filled or emptied of liquid.

In Fig. 2, the details of each frame, or unit, are more clearly shown, referring to same, 28, 29 and 30 are openings or conduits through the frame and are each provided with a groove 31 for a gasket. When the gaskets are in place and the series of frames clamped together, these conduits form continuous openings through the entire length of the filter.

A suitable pipe connection 32 connects conduit 21, which runs from one side of the frame to the other, with a three-way valve 33, so that the interior of the filter devices 20 may be placed in communication with either the conduit 28 or 29 at the will of the operator. These conduits terminate at the end of the filter in the pipe connections 28^A and 29^A. By means of the pipe connection 34 and the valve 35, the perforated spray pipes 22 are brought into communication with the conduit 30.

By a study of the foregoing arrangements, it will be understood that if a pressure of liquid is maintained in the conduit 30, the liquid may be projected through all of the spray pipes 22 simultaneously, or by means of the valves 35 the spray may be projected through any individual spray pipe, or any number of spray pipes, as may be desired by the operator. The advantage of this arrangement is that if but a small volume of water under pressure is available, the entire pressure may be concentrated in one spray pipe, at a time, and thus the maximum efficiency and cleaning power obtained from it.

When in operation, the clear filtrate passes through the pipe 32 into the conduit 29, and the cock 36 is provided to enable the operator to obtain samples of filtrate from each unit when desired, and if a leak in the filtering medium should occur at any time, the operator can easily determine which unit contains the leak by taking samples from these cocks.

Referring to Fig. 3, each filter device 20 is provided with the perforated pipes 37, which are attached to a corrugated board 38 by means of the bands 39. A tee 40 unites the two pieces of pipe 37 and into this tee is screwed the nipple 41, which is provided with a continuous thread over its entire length. A lock nut 42 is screwed on this nipple.

The filtering medium is generally a layer of heavy canvas 43. A hole is cut through this canvas at the point 44 just large enough to admit the nipple 41 to pass through it. In practice the filtering canvas is sewed along the edges 45, which makes it in the form of a bag with the edge 46 left open. The hole 44 is then cut and the whole interior portion slipped into the bag and the lock nut 42 tightly screwed down, which makes a tight joint around the canvas. If desired, the canvas may be reinforced at this point, or a washer may be placed under the lock nut to insure a tight joint. The open end of the bag is then closed by the clip 47, shown in detail in Fig. 5, which makes the filtering surface intact, so that it is impossible for any liquid to finally get into the conduit 21 without first passing through the filtering canvas when the filter devices are screwed tightly in place, as shown in Fig. 2. The nipple 41 has connection with the conduit 21 through a series of holes 48 which are tapped into the conduit. Clip 47 is comprised of two arms 49 and 50 provided with a pivot 51 at one end, and the link 52 at the other, which holds them together when applied to the open end of the canvas bag. These clips are preferably applied by first rolling the canvas once or twice around one of the arms and then springing the other one into position and applying the link 52.

In the modification shown in Fig. 8, the construction of the frame is essentially the same as Fig. 2, with the exception that the filter devices 20 are tubular in form instead of being flat. Each filter device is assembled and screwed into the threaded openings 48 in the same manner as were the flat filter devices in Fig. 2. The spray pipe 22 is clearly shown in this figure, and in this modification, as well as in the arrangement shown in the other figures, the adhering residue, or unfilterable matter may be washed from the exterior of the filter devices by means of projecting a spray upon their exterior. It will be understood that with both arrangements, the removal of the solid matter is assisted by the application of pressure to the interior of the filter devices preferably applied while the spray pipes are in action.

Referring to Fig. 10, each tubular filter device comprises an inner member of perforated pipe 53, the lower end of which is closed by the plug 54. Around this pipe, a layer of any convenient porous material may be placed, such as wire screen, cocoa matting or burlap. I prefer to use cocoa matting, as shown 55. The outer cover, or bag, of canvas 56 incloses the entire interior portion and is held in place by the clip 57. A reducer 59 is screwed to the pipe and this reducer in turn screws into the openings 48.

The method of operating is as follows: The liquid to be filtered may be brought into the main chamber of the filter through any convenient opening, but I prefer to enter the liquid through the valve 17. While the chamber is filling, the vent 27 is open to allow the inclosed air to escape. As soon as the chamber is full the vent 27 is closed and as the liquid continues to enter under pressure it is forced through the canvas of the filter devices 20, follows the corrugations in the board 38 into the perforated pipes 37, out through the nipple 41, into the conduit 21, through the pipes 32 and valve 33 and into the conduit 29 out of which it finally passes into any convenient receptacle through the pipe 29<sup>A</sup>. It is assumed, of course, that while filtration is in progress all valves are so arranged that no liquid can pass out of the chamber of the filter without first passing through the filtering canvas 43. As filtration progresses, the solid matter contained in the liquid is deposited upon the canvas of the filter devices 20, and since the pressure throughout the entire chamber, from one end to the other, is equal, it follows that filtration is even and the cakes build up of uniform thickness.

In practice the frames are about five inches wide and rows of filter devices are therefore this distance between centers.

If the solid matter, contained in the liquid being filtered, is of a porous nature the cakes of residuum may be deposited about 2″ in thickness, but if the residuum is of such a nature as to offer a high resistance to filtration, the thickness of the cakes may be varied accordingly.

In the treatment of finely divided ore, called slimes in the cyanid process, it is desirable after the cakes have been deposited to wash out any soluble material that may remain in them, and to accomplish this object, after a cake of convenient thickness has been deposited, the pressure in the chamber is allowed to subside and at the same time a partial vacuum is brought to bear within the conduit 29 by means of a pump, (not shown in the drawings) which is directly connected with the pipe 29<sup>A</sup>. The object of this vacuum is to hold the cakes in place when they have been relieved of pressure upon their outer surface, for if a cake of very great thickness has been deposited, it would fall from the filter devices by its own gravity if left for any considerable length of time, but I have found that a vacuum of about 5″ will hold the cakes in place for any reasonable length of time. Having connected the partial vacuum with the conduit 29, which is now in communication with the interior of all of the filter devices, the vent 27 is opened and the contents of the chamber are drained to any convenient receptacle through the valve 18. If during filtration, any sediment has settled in the bottom of the chamber (which in ordinary practice is not likely to occur), it may be removed by a stream of liquid projected through the nozzle 25, while the valve 18 is still open. The entire liquid contents of the filtering tank, or chamber, have now been removed with the exception of such unfilterable matter as is clinging to the sides of the filter devices. If it is desirable to partially dry the cakes, or treat them in place by passing air or any other gas through them, it may be done at this stage by simply introducing such gas into the chamber under pressure as it is desired to treat the contents with. The next step is to wash the adhering cakes of residue to remove any soluble matter contained therein, and to accomplish this, I introduce the liquid, with which the cakes are to be washed, through the valve 17 again allowing the inclosed air to escape through the vent 27. As soon as the chamber is filled with the washing liquid, the vacuum, which is applied through the conduit 29, is discontinued, as the pressure of the wash liquid upon the exterior of the cakes is sufficient to hold them in place. The wash liquid percolates through the cake and finds its way into the conduit 29, the same as did the filtrate. The washing is continued until the soluble matter is removed from the cakes. When this is accomplished, the washing fluid in the chamber is returned to a convenient receptacle to be used over again.

It is obvious that the filter herein described may be used for filtering valuable solid matter from liquids, in cases where the solids are to be retained and the liquids rejected. For such service my filter offers two particular advantages. First, the cakes of adhering solid matter may be removed from the filter surfaces without opening the filter, as often as may be desired, and consequently, filtration is not retarded by a deposit upon the filtering surfaces. In this case the solid matter is allowed to remain in the space 26 to be removed when convenient. Second, the space 26 forms a storage chamber for accumulated solid matter where it may remain without interference to filtration until it is desired to recover it. For instance, in the filtration of gold-zinc slimes when zinc precipitation is used in the cyanid process, the gold-zinc product may be retained in the filter without danger of loss or inconvenience until time for a general clean-up. For such service the space 26 may be made as large as necessary to hold the accumulated product for any desired period.

*Discharging the residues.*—The washed residues now in place clinging to the filter devices are to be discharged. This may be accomplished by two entirely different methods with the same construction. The methods will be described separately.

Method No. 1: When the filter is installed, a pipe is connected with the conduit 30, which connects it with a convenient source of water supply under pressure, so that whenever the valves 35 are opened a plurality of jets or streams of water are projected upon the filter devices through the perforated pipes 22. If an abundant supply of water is available, all of the valves 35 will be left open at all times and the main valve, which admits water to the conduit 30, is opened and all of the spray pipes are thus brought into action simultaneously, with the result that the solid matter adhering to the filter devices is removed, and the mixture of water and unfilterable matter runs out of the chamber of its own gravity, through the opening 26 and out through the hopper 16 and the valve 18 into the launder 19. After the spray pipes have been in action for a few moments it is advisable to assist the cleansing of the filter devices by applying a fluid under pressure to the interior of the filter devices. To accomplish this end a moderate pressure, preferably of water, is maintained within the conduit 28; by turning the three-way valve 33, the pressure in this conduit is brought to bear upon the interior of the filtering medium. This pressure distends the filter bags and immediately dislodges any residue that may remain thereon, and furthermore, especially if the fluid used is water, it passes outwardly through the pores of the filter canvas and has a tendency to free the pores of any minute particles of solid matter that may have lodged therein that would have a tendency to retard filtration. The residues having thus been discharged from the chamber of the filter, the valves are suitably arranged and the machine is again ready for another cycle of operations.

Method No. 2: In this method of discharging, the spray pipes are not used, but before commencing to discharge, the valve 18 is opened and the valve 24 on the pipe 23, which carries water under a high pressure, is caused to project a swift stream of water through the nozzle 25. The arrangement of these nozzles is purely a matter of design. One large one may be used, or a plurality of small ones arranged to distribute the current of water to the best advantage. This swiftly moving current of water being started, all that is necessary to discharge the cakes of residue, is for the operator to manipulate the three-way valves 33. During this operation, a partial vacuum is maintained in the conduit 29, while a liquid, vapor or gas under pressure is maintained in the conduit 28. All of the three-way valves 33 at the commencement of the operation are in such a position that the vacuum is holding the cakes in position. The valves are then turned one at a time, so as to bring the pressure in conduit 28 in connection with the interior of the filter devices, and the result is that the cakes from each frame drop almost instantaneously when pressure is applied within the filter devices, into the space 26, and are swept away by the current of liquid from the nozzle 25, which carries them out of the chamber of the filter press, through the hopper 16 and valve 18 into the launder 19, from which it is run to waste.

My invention is not limited to the form of filter devices shown, nor the shape or size of the space or channel below them. If desired, the interior portion of the filter device may be cast integral with the frame, but I prefer the detachable form of filter device.

Having thus described my invention, what I claim is:

1. In a pressure filter comprising a chamber built up of a plurality of sections held together, filter devices in the upper portion of said chamber and an open passageway below the filter devices, means of projecting a stream of liquid through the passageway to carry away residual matter caused to fall from said filter devices into said passageway.

2. In a sectional pressure filter comprising a filtering chamber, filtering devices in the upper portion of said chamber, an open space within said chamber communicating with the filter devices, means of projecting a plurality of jets of liquid upon the filter devices, at a point near the top thereof, means of draining the mixture of liquid and residuum from said open space.

3. In a pressure filter comprising a filtering chamber composed of a series of hollow sections clamped together, filtering means in the upper portion of said chamber, a space below said filtering means adapted to receive unfilterable matter caused to fall from said filtering means, means of cleaning the space below said filtering means by the passage of a stream of liquid therethrough.

4. In a pressure filter comprising a filtering chamber built up of a series of sections clamped together with water tight joints between said sections, a plurality of filter devices within each section, means of washing the exterior of said filter devices by projecting a series of jets of liquid thereon.

5. In a pressure filter comprising a filtering chamber built up of a series of sections clamped together with water tight joints between said sections, a plurality of detachable filter devices within each section, means of washing said filter devices by projecting a series of jets of liquid thereon, and means of conducting the mixture of washing liquid and residuum therefrom.

6. In a pressure filter comprising a series of frames clamped together to form a filtering chamber, detachable filter devices in the upper portion of said frames, said filter devices being in an approximately vertical position while the longitudinal axis of the filtering chamber slopes toward a discharge opening at the lower end thereof.

7. In a pressure filter, a main body built up of a plurality of sections held side by side and sealed at the joints, a passageway in each section, said passageways alining to form a continuous conduit when in place, filtering means within said body, a chamber within the body below the filtering means adapted to form a receptacle for material falling from the filter devices, means of flushing said chamber by a liquid under pressure.

8. In a sectional pressure filter comprising a filtering chamber, filter devices in the upper part of said chamber, suitable means of projecting a spray of liquid upon said filter devices, a channel adapted to drain the mixture of liquid and unfilterable matter falling from the filter devices.

9. In a filter comprising a chamber built up of a plurality of sections with filter devices therein, means of removing unfilterable matter from the filter devices by admitting a fluid under pressure within the filter devices and suitable means of washing away the unfilterable material by a stream of liquid below the filter devices.

10. In a filter, a sectional filtering chamber, a plurality of filter devices within said chamber, said filter devices comprising an inner corrugated member inclosed within a filtering fabric, an open unobstructed passageway within said chamber in communication with said filter devices, means of projecting a plurality of jets of liquid upon said filter devices at a point near the top thereof, means of draining the liquid so projected from the bottom of said filtering chamber.

11. In a filter, a sectional filtering chamber with a plurality of filter devices in the upper portion thereof, said filter devices comprising an outer covering of a woven fabric, an open unobstructed passageway within said chamber in communication with said filter devices, means of projecting a plurality of jets of liquid upon said filter devices at a point near the top thereof, means of draining the liquid so projected from the bottom of said filtering chamber.

12. In a pressure filter comprising a series of sections clamped together to form a filtering chamber, filtering means in the upper portion of said chamber, a space between the filtering means and the lower walls of said chamber, a drainage opening communicating with the said space.

13. In a frame for pressure filters having an inner member provided with two plane parallel surfaces, a web cast integral with said inner member and a bulb about the outer edges of said web cast integral thereto.

14. In a frame for pressure filters having an inner member provided with two parallel surfaces, a gasket groove in one of the surfaces, a web cast integral with said inner member and a bulb about the outer edges of said web cast integral thereto.

15. In a frame for pressure filters wherein a web is cast upon said frame, and a bulb is cast upon the outer edge of said web.

16. In a frame for pressure filters provided with a plate of metal formed about its periphery, and a strengthening rib formed upon the outer edge of said plate.

17. In a frame for pressure filters comprising an inner wall, a web with a bulb upon its outer edges cast integral to said frame, and a hollow conduit cast upon said frame adapted to form a longitudinal passageway through said filter when the frames are clamped together.

18. In a frame for pressure filters having a strengthening rib formed upon its outer surface, said rib being of increased cross sectional area upon that side of the neutral axis which is subjected to tension when pressure is applied to the interior of the frame.

19. In a frame for pressure filters provided with means of projecting a series of jets within said frame, each frame being provided with a suitable valve whereby the jets may be turned on or off at will.

20. In a frame for pressure filters provided with filtering means, a plurality of conduits through said frame, suitable means of connecting the interior filtering means with any one of the conduits at the will of the operator.

21. In a frame for pressure filters having a passageway through one of its walls, a duct between said passageway and the main opening of the frame, means of opening and closing the duct at will.

22. In a frame for pressure filters, having filtering means in the upper portion thereof and an open space between the inner walls of the frame and the filtering means.

23. In a unit for pressure filters comprising an open frame, with a plurality of openings at the top thereof for the entrance of a cleansing medium.

24. In a unit for pressure filters comprising an open frame, with a plurality of openings at the top thereof for the entrance of a cleansing medium, and a valve on each unit to control the entrance of liquid through the openings.

25. In a unit for pressure filters comprising a frame with a plurality of tubular filter devices suitably supported within said frame.

26. In a unit for pressure filters comprising a frame with a plurality of tubular filter devices therein, means of removing unfilterable matter from said filter devices by a plurality of jets of cleansing medium applied to the exterior thereof.

27. In a frame for pressure filters having filtering means therein, and a device for projecting a series of jets of liquid upon said filtering means.

28. In a frame for pressure filters having filtering means in the upper portion thereof and an unoccupied space below said filtering means.

29. In a frame for pressure filters having filtering means in the upper portion thereof and an unoccupied space below said filtering means, means of projecting a plurality of jets upon the filtering means from a device near the top of the frame.

30. In a frame for pressure filters having filtering means carried by said frame, means of projecting a cleansing medium upon the filtering means, and a valve carried by each frame adapted to control the flow of cleansing medium.

31. In a frame for pressure filters, a conduit through said frame for drainage of filtered liquid, a passageway through which the filtered liquid may enter the conduit and means of closing and opening the passageway leading to the conduit.

32. In a frame for pressure filters, a plurality of conduits through said frame, means of conducting the filtrate from the interior of the frame into any desired conduit, or conducting a liquid from any desired conduit into the interior of the frame as may be desired.

33. In a frame for pressure filters, a passageway through the frame parallel with the main opening of said frame, a pipe connection forming communication between the passageway and the main opening of the frame and a valve on said pipe.

34. In a section for pressure filters, a pipe connection between the interior of said section and a passageway therein and a valve upon said pipe connection.

35. In a section for pressure filters, a pipe connection between the interior of said section and a passageway therein, a controllable opening in said pipe connection through which samples of the filtered liquid may be taken when desired.

36. In a frame for pressure filters, having a rectangular upper portion and a V-shaped lower portion, detachable filtering means within said frame.

37. In a frame for pressure filters, having a square upper portion and a V-shaped lower portion, detachable filtering means within said frame.

38. In a pressure filter comprising a series of sections clamped together and sealed at the joints, filtering means in the upper portion of said sections, and an open space within the body of the filter in communication with the filter devices into which residual matter may fall from the filter devices, means of sluicing residual matter from said open space.

39. In a frame for pressure filters, a perforated device in the upper portion thereof whereby a series of streams of liquid may be projected upon a filtering surface adjacent thereto.

40. In a frame for pressure filters, a pipe attached to the interior thereof, an opening in said pipe through which a fluid may be projected upon a filtering surface adjacent thereto.

41. In a frame for pressure filters, a pipe attached to the interior thereof, a plurality of openings in said pipe through which a fluid may be projected upon a filtering surface adjacent thereto.

42. In a filter, a filtering chamber formed by a plurality of sections held together, filtering means within the chamber, a space below the filtering means, means of cleaning said space by flushing with a liquid.

43. In a filter, a filter body formed by a plurality of sections held together, filtering means supported within the body, a space within the body below the filtering means, an inlet opening communicating with said space through which a cleansing fluid may be projected into the space.

44. The combination of a filter frame having a conduit through one of the walls thereof and a passageway between the conduit and the interior of the frame, with a filter device secured within the frame having communication with the conduit.

In testimony whereof, I have hereunto set my hand at Los Angeles, California, this 23rd day of January, 1909.

ERNEST J. SWEETLAND.

In presence of—
LUTE S. ALTER,
GRACE H. BLAIR.